US010279438B2

(12) United States Patent
Ozbaysal et al.

(10) Patent No.: US 10,279,438 B2
(45) Date of Patent: May 7, 2019

(54) PRESINTERED PREFORM FOR REPAIR OF SUPERALLOY COMPONENT

(71) Applicant: Siemens Energy, Inc., Orlando, FL (US)

(72) Inventors: Kazim Ozbaysal, Orlando, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 563 days.

(21) Appl. No.: 14/767,967

(22) PCT Filed: Mar. 14, 2014

(86) PCT No.: PCT/US2014/028168
§ 371 (c)(1),
(2) Date: Aug. 14, 2015

(87) PCT Pub. No.: WO2014/143963
PCT Pub. Date: Sep. 18, 2014

(65) Prior Publication Data
US 2015/0367456 A1 Dec. 24, 2015

Related U.S. Application Data

(60) Provisional application No. 61/786,920, filed on Mar. 15, 2013.

(51) Int. Cl.
B23P 6/04 (2006.01)
B22F 3/12 (2006.01)
(Continued)

(52) U.S. Cl.
CPC .............. B23P 6/045 (2013.01); B22F 3/12 (2013.01); B22F 5/009 (2013.01); B22F 7/062 (2013.01);
(Continued)

(58) Field of Classification Search
CPC .............. B22F 3/12; B22F 5/04; B23P 6/045
See application file for complete search history.

(56) References Cited

U.S. PATENT DOCUMENTS 3,728,088 A * 4/1973 Benjamin ................. B22F 9/04
75/233
4,008,844 A * 2/1977 Duvall ................. B22F 1/0003
228/119
(Continued)

FOREIGN PATENT DOCUMENTS

CN 1994646 A 7/2007
CN 101147993 A 3/2008
(Continued)

OTHER PUBLICATIONS

Gessinger. Powder Metallurgy of Superalloys: Buttersworths Monogrpahs in Materials. University Press, Cambridge. 1984. pp. 60-61.*
(Continued)

Primary Examiner — Matthew E. Hoban

(57) ABSTRACT

A method of making pre-sintered preforms using a mixture of base superalloy particles and titanium-containing boron and silicon free braze alloy particles, such as for the repair of superalloy gas turbine engine components. Alloy particles as large as 2 mm provide reduced shrinkage when compared to prior art preforms. Braze material compositions disclosed herein are boron and silicon free and may have melting temperature ranges as low as 10° C., and they include no element not already present in the composition of the superalloy component.

19 Claims, 1 Drawing Sheet

(51) Int. Cl.

| | | |
|---|---|---|
| *B22F 5/04* | (2006.01) | |
| *B23K 35/30* | (2006.01) | |
| *B23K 35/32* | (2006.01) | |
| *B23P 6/00* | (2006.01) | |
| *B23K 35/02* | (2006.01) | |
| *C21D 9/50* | (2006.01) | |
| *C22C 1/04* | (2006.01) | |
| *C22C 19/05* | (2006.01) | |
| *C22C 19/00* | (2006.01) | |
| *B22F 7/06* | (2006.01) | |
| *B22F 5/00* | (2006.01) | |

(52) U.S. Cl.
CPC ........ *B23K 35/025* (2013.01); *B23K 35/0222* (2013.01); *B23K 35/0244* (2013.01); *B23K 35/30* (2013.01); *B23K 35/304* (2013.01); *B23K 35/3033* (2013.01); *B23K 35/325* (2013.01); *B23P 6/005* (2013.01); *C21D 9/50* (2013.01); *C22C 1/0433* (2013.01); *C22C 19/007* (2013.01); *C22C 19/05* (2013.01); *C22C 19/056* (2013.01); *B22F 2007/068* (2013.01); *B22F 2304/15* (2013.01)

(56) References Cited

U.S. PATENT DOCUMENTS

| | | | |
|---|---|---|---|
| 4,073,639 A * | 2/1978 | Duvall | B22F 1/0003 75/255 |
| 5,156,321 A * | 10/1992 | Liburdi | B22F 7/062 228/119 |
| 6,027,584 A | 2/2000 | Jackson et al. | |
| 6,464,128 B1 | 10/2002 | Messelling | |
| 6,520,401 B1 | 2/2003 | Miglietti | |
| 6,530,971 B1 | 3/2003 | Cohen et al. | |
| 6,726,086 B2 | 4/2004 | Phillip | |
| 7,293,688 B2 | 11/2007 | Ozbaysal | |
| 7,328,832 B2 | 2/2008 | Ozbaysal | |
| 7,335,427 B2 | 2/2008 | Sathian | |
| 7,363,707 B2 | 4/2008 | Powers | |
| 7,434,720 B2 | 10/2008 | Ozbaysal | |
| 7,461,772 B2 | 12/2008 | Ozbaysal | |
| 7,506,793 B2 | 3/2009 | Sathian | |
| 7,748,601 B2 | 7/2010 | Ozbaysal | |
| 7,867,628 B2 | 1/2011 | Ozbaysal | |
| 8,087,565 B2 | 1/2012 | Kottilingam et al. | |
| 8,356,409 B2 | 1/2013 | Perret | |
| 8,640,942 B1 | 2/2014 | Ozbaysal | |
| 2004/0124231 A1 | 7/2004 | Hasz | |
| 2005/0281704 A1 | 12/2005 | Srinivasan | |
| 2006/0216540 A1* | 9/2006 | Budinger | C22C 19/057 428/680 |
| 2009/0159645 A1 | 6/2009 | Cretegny et al. | |
| 2010/0038412 A1 | 2/2010 | Huang | |
| 2010/0059573 A1 | 3/2010 | Kottilingam et al. | |
| 2010/0237134 A1* | 9/2010 | Bucci | B22F 7/062 228/119 |
| 2011/0081480 A1* | 4/2011 | Bucci | B23K 1/0018 427/142 |
| 2011/0180199 A1* | 7/2011 | Huxol | B22F 3/04 156/94 |
| 2014/0007988 A1 | 1/2014 | Ozbaysal | |

FOREIGN PATENT DOCUMENTS

| | | |
|---|---|---|
| CN | 101316940 A | 12/2008 |
| EP | 1050663 A2 | 11/2000 |
| EP | 1516942 A1 | 3/2005 |
| EP | 1803521 A1 | 7/2007 |
| GB | 752117 A | 7/1956 |

OTHER PUBLICATIONS

Warren Miglietti, High Strength, Ductile Braze Repairs for Stationary Gas Turbine Components, Part 2, ASME Conference Proceedings, ASME Turbo Expo 2009: Power for Land, Sea, and Air (GT2009), Jun. 8-12, 2009, Orlando, Florida, USA.

Xiao Huang, et al., Wide Gap Braze Repair of Gas Turbine Blades and Vanes—A Review, Journal of Engineering for Gas Turbines and Power, vol. 134, Jan. 2012, pp. 010801-1 thru 010801-17.

* cited by examiner

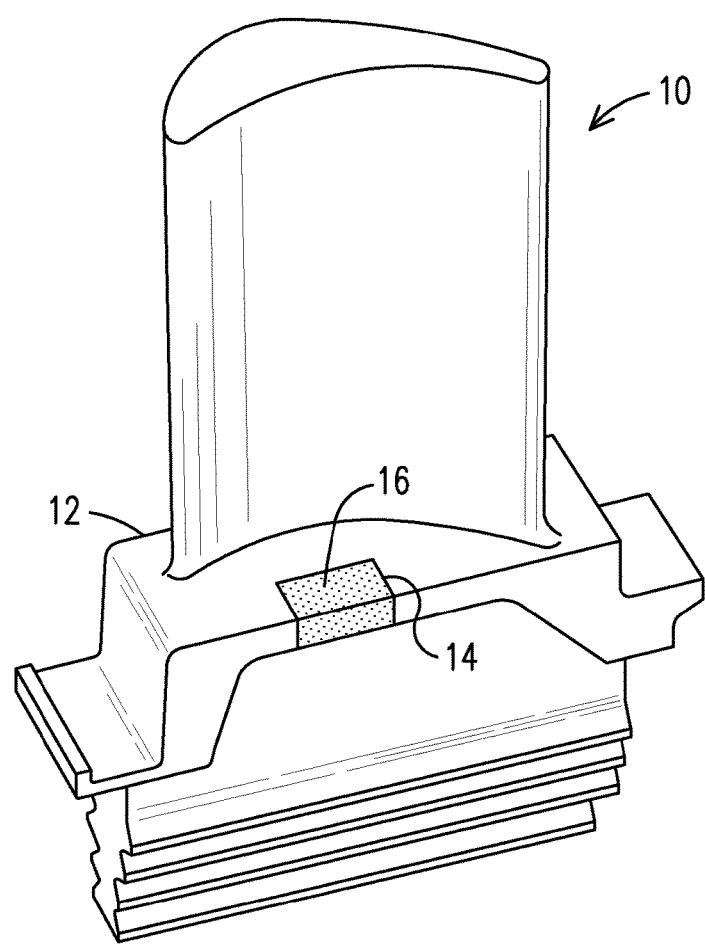

PRESINTERED PREFORM FOR REPAIR OF SUPERALLOY COMPONENT

This application claims benefit of the 15 Mar. 2013 filing date of U.S. provisional patent application No. 61/786,920.

FIELD OF THE INVENTION

This invention relates generally to the field of materials technology, and more specifically to the repair of superalloy components using a presintered preform containing a boron-free braze material.

BACKGROUND OF THE INVENTION

It is recognized that the repair of superalloy materials is made difficult due to their susceptibility to weld solidification cracking and strain age cracking. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, 0263, 718, X-750, ECY 768, 282, X45, PWA 1483 and CMSX (e.g. CMSX-4) single crystal alloys.

It is known to repair superalloy gas turbine engine components using a presintered preform containing a mixture of base alloy particles having a composition similar to the alloy of the component, braze alloy particles containing a melting point depressant such as boron or silicon, and a binder. See for example U.S. Pat. No. 8,087,565 B2. However, boron and silicon create deleterious phases which reduce the ductility of the joint and repaired region. Boron and silicon free braze alloys incorporating hafnium and/or zirconium have been developed, however, such materials tend to form carbides at the braze joint. Thus, further improvements in the repair of superalloy materials are desired.

BRIEF DESCRIPTION OF THE DRAWINGS

The invention is explained in the following description in view of the sole FIGURE that shows a gas turbine engine blade repaired with a presintered preform.

DETAILED DESCRIPTION OF THE INVENTION

Boron and silicon free braze alloys utilizing titanium as a melting point depressant material are disclosed in co-pending U.S. patent application Ser. No. 13/495,223 filed 13 Jun. 2012, as well as U.S. Pat. No. 8,640,942, both assigned to the assignee of the present invention and both incorporated by reference herein. Additional boron and silicon free braze alloys useful for use with a preform for the repair of superalloy substrate materials are disclosed herein, including alloys that advantageously have a reduced melting temperature range when compared to prior art hafnium-based braze alloys. These provide brazed joints having mechanical properties sufficiently close to (e.g. at least 80% of) the repaired substrate material properties such that the repair can be considered a structural repair and can be used in relatively high stressed regions of the component.

Prior art preforms used for the repair of superalloy gas turbine engine components are known to be formed of very small particles in order to promote rapid sintering and to minimize porosity. For example, U.S. Pat. No. 8,087,565 B2 teaches the use of powders generally smaller than 150 mesh, and more preferably 325 mesh (44 microns) or smaller. Furthermore, larger particles are contraindicated in the prior art because they produce a higher volume of void space between particles that must be filled by the weaker braze alloy. The present inventors have discovered that much larger alloy particles can be used in a preform when combined with the relatively stronger braze alloys disclosed herein, and that such larger particles advantageously provide reduced shrinkage when compared to prior art preforms made with smaller particles. Moreover, because the disclosed braze particles contain no boron or silicon, the resulting structure provides mechanical properties that allow such preforms to be used in structural applications, such as for the repair of a platform of a gas turbine engine blade or vane. Alloy particles as large as 2,000 microns (2 mm) may be used. Not only do these larger particles provide reduced shrinkage, they are also less expensive to manufacture than smaller particles and are easier and safer to handle with reduced wastage and therefore less environmental impact than the fine powders used in prior art preforms.

In exemplary embodiments, a multi-component boron and silicon free low melting point Ni—Cr—Ti ternary braze alloy with a melting temperature range of less than 50° C. or as low as 10° C. is mixed with particles of a base superalloy material, such as Alloy 247, Rene 80 or IN 939 for examples. The superalloy particles will typically be of the same alloy as that of the component to be repaired, although a different alloy may be used in some embodiments. The portion of braze alloy in the powder mixture may be 5-50% by weight in some embodiments, or from 5% to less than 30% by weight in other embodiments. The base alloy particle size range may include particles larger than 140 US mesh (104 microns), or larger than 100 US mesh (152 microns), or as large as 2,000 microns (2 mm). The braze material particles mesh range may be smaller than that of the base alloy particles. The mixture is presintered at pressure and at a temperature less than the solidus temperatures of the braze and superalloy particles, such as less than 1,185° C., under a pressure of a minimum of 15 ksi and an inert atmosphere until the porosity is less than 5% by volume. The presintered material is formed in a net shape or is subsequently reshaped for use as a preform in a repair process.

The sole FIGURE illustrates a gas turbine engine blade 10 having a platform section 12 wherein a damaged section has been removed and a presintered preform 16 in accordance with an embodiment of this invention has been installed. A thin layer of braze material 14 applied as a foil or paste may be used to join the preform 16 to the platform 12. Alternatively, the preform 16 may be formed to have an outer joining periphery surface adjacent the platform 12 that is predominantly or entirely braze material. The braze material 14 may advantageously be the same braze material used in the preform 16. The braze joint may be homogenized with a solution heat treatment applied to the blade 10 in order to rejuvenate the material properties of the superalloy material of the blade 10. Advantageously, no element of the braze material is an element that is not already part of the component superalloy material or the base powder superalloy composition such that the homogenization does not introduce any new element into the crystal structure and so that the composition of the finally treated preform and braze joint are very similar to that of the base component alloy composition.

A ternary braze alloy for such applications may have compositions within the following ranges (all compositions disclosed herein are in units of wt. %):

Cr 15-25%;
Ti 15-25%;
balance Ni.

Particular braze alloys within this group may have the following compositions: Cr 16.3%, Ti 21.2%, balance Ni; or Cr 17.2%, Ti 20.9%, balance Ni. These particular braze alloy compositions exhibit a solidus temperature of about 1,205° C. and a liquidus temperature of about 1,215° C., and thus a melting temperature range of only 10° C. As such, they may be particularly useful for use with Alloy 247 or Rene 80, for example. Another braze alloy within this group has the following composition: Cr 20%, Ti 20%, Ni 60%.

Other braze alloys may have compositions within the following ranges:

Cr 12-16%;
Ti 13-16%;
Al 0-2.5%;
Co 2-4%;
W 3-5%;
Mo 0-2%;
Ta 0-2%;
balance Ni.

A particular braze alloy within this group may have the following composition: Cr 14.1%, Ti 14%, Al 2.1%, Co 3.1%, W 4.1%, Mo 1%, Ta 1%, balance Ni, and may be used with Alloy 247 for example.

Other braze alloys may have compositions within the following ranges:

Cr 15-18%;
Ti 10-15%;
Al 0-2.5%;
Co 2-4%;
W 3-5%;
Mo 0-2%;
Ta 0-2%;
balance Ni.

A particular braze alloy within this group may have the following composition: Cr 17.57%, Ti 13.54%, Al 2.39%, Co 3.24%, W 3.47%, Mo 1.15%, Ta 0.83% balance Ni. This particular braze alloy composition exhibits a solidus temperature of about 1,205° C. and a liquidus temperature of about 1,220° C., and thus a melting temperature range of only 15° C., and may be used with Alloy 247 or Rene 80 for example.

Other braze alloys may have compositions within the following ranges:

Cr 15-19%;
Ti 8-10%;
Al 0-2.5%;
Co 14-18%;
Mo 12-16%;
balance Ni.

A particular braze alloy within this group may have the following composition: Cr 15.12%, Ti 10%, Al 2.12%, Co 15.8%, Mo 12.97%, balance Ni. This particular braze alloy composition exhibits a solidus temperature of about 1,205° C. and a liquidus temperature of about 1,223° C., and thus a melting temperature range of only 18° C., and may be used with Alloy 247 or IN 939 for example.

A typical solution heat treatment effective to join such a preform and to homogenize a braze joint of the preform to the component for such alloys may be:

heat the assembly to 1,472° F. (800° C.) at 15-30° F. (8.3-16.6° C.) per minute;
hold at 1,472° F. for 20 minutes;
heat to 2,125° F. (1,163° C.) at 15-30° F. per minute;
hold at 2,125° F. for 20 minutes;
heat to 2,192-2,282° F. (1,200-1,250° C.) at 1-30° F. (0.6-16.6° C.) per minute;
hold at 2,192-2,282° F. for 2-12 hours;
furnace cool to 2,120-2,192° F. (1,160-1,200° C.);
hold at 2,120-2,192° F. up to 20 minutes;
argon cool to room temperature.

While various embodiments of the present invention have been shown and described herein, it will be obvious that such embodiments are provided by way of example only. Numerous variations, changes and substitutions may be made without departing from the invention herein.

The invention claimed is:

1. A method comprising:
    forming a preform from a powder mixture comprising superalloy material particles and boron and silicon free braze material particles comprising titanium, a size range of the superalloy material particles comprising particles larger than 140 US mesh; and
    sintering the preform at a temperature below solidus temperatures of the superalloy and braze material particles,
    wherein a first size of the superalloy particles is larger than a second size of the braze material particles, and
    wherein the powder mixture comprises from 5% to 50% by weight braze material particles.

2. The method of claim 1, further comprising joining the sintered preform to a superalloy component with a braze joint formed from braze material particles disposed on a periphery of the preform.

3. The method of claim 1, further comprising joining the sintered preform to a superalloy component with a braze joint formed from braze material applied between the preform and a surface of the component.

4. The method of claim 1, further comprising forming the preform from a powder mixture comprising superalloy material particles larger than 100 US mesh.

5. The method of claim 1, further comprising forming the preform from a powder mixture comprising superalloy material particles as large as 2,000 microns.

6. The method of claim 1, further comprising sintering the preform to a porosity of less than 5% by volume.

7. The method of claim 1, further comprising forming the preform from a powder mixture comprising braze material particles having a composition of Cr 15-25%; Ti 15-25%; balance Ni.

8. The method of claim 1, further comprising forming the preform from a powder mixture comprising braze material particles having a composition of:

Cr 12-16%;
Ti 13-16%;
Al 0-2.5%
Co 2-4%
W 3-5%
Mo 0-2%;
Ta 0-2%;
Balance Ni.

9. The method of claim 1, further comprising forming the preform from a powder mixture comprising braze material particles having a composition of:

Cr 15-18%;
Ti 10-15%;
Al 0-2.5%
Co 2-4%
W 3-5%

Mo 0-2%;
Ta 0-2%;
balance Ni.

10. The method of claim 1, further comprising forming the preform from a powder mixture comprising braze material particles having a composition of:
Cr 15-19%;
Ti 8-10%;
Al 0-2.5%
Co 14-18%
Mo 12-16%;
balance Ni.

11. The method of claim 1, further comprising:
joining the sintered preform to a superalloy component with a braze joint; and
homogenizing the braze joint with a solution heat treatment applied to the component in order to rejuvenate material properties of the superalloy component.

12. The method of claim 1, further comprising selecting a composition of the braze material particles to include no element that is not part of a composition of the superalloy particles.

13. A method comprising:
forming a preform from a powder mixture comprising superalloy material particles and braze material particles, a size range of the superalloy material particles comprising particles larger than 140 US mesh, and a composition of the braze material particles having a melting temperature range of less than 50° C.; and
sintering the preform at a temperature less than solidus temperatures of the superalloy material and braze material particles, under a pressure of minimum of 15 ksi and an inert atmosphere until the porosity is less than 5% by volume, wherein a first size of the superalloy particles is larger than a second size of the braze material particles, and
wherein the powder mixture comprises from 5% to 50% by weight braze material particles.

14. The method of claim 13, further comprising forming the preform from a powder mixture comprising braze material particles having a composition of Cr 15-25%; Ti 15-25%; balance Ni.

15. The method of claim 13, further comprising forming the preform from a powder mixture comprising braze material particles having a composition of:
Cr 12-16%;
Ti 13-16%;
Al 0-2.5%;
Co 2-4%;
W 3-5%;
Mo 0-2%;
Ta 0-2%;
balance Ni.

16. The method of claim 13, further comprising forming the preform from a powder mixture comprising braze material particles having a composition of:
Cr 15-18%;
Ti 10-15%;
Al 0-2.5%;
Co 2-4%;
W 3-5%;
Mo 0-2%;
Ta 0-2%;
balance Ni.

17. The method of claim 13, further comprising forming the preform from a powder mixture comprising braze material particles having a composition of:
Cr 15-19%;
Ti 8-10%;
Al 0-2.5%
Co 14-18%
Mo 12-16%;
balance Ni.

18. The method of claim 13, further comprising:
joining the sintered preform to a superalloy component with a braze joint; and
homogenizing the braze joint with a solution heat treatment applied to the component in order to rejuvenate material properties of the superalloy component.

19. The method of claim 1, further comprising forming the preform with the braze material particles having a melting temperature range of less than 50° C.

* * * * *